United States Patent Office 3,551,454
Patented Dec. 29, 1970

3,551,454
PREPARATION OF OPTICALLY ACTIVE
(—)-ZEARALENONE AND INTERMEDI-
ATES THEREFOR
David Taub, Metuchen, and Chan-Hwa Kuo, South Plainfield, N.J., assignors to Merck & Co., Inc., Rahway, N.J., a corporation of New Jersey
No Drawing. Filed July 26, 1967, Ser. No. 656,075
Int. Cl. C07d 9/00
U.S. Cl. 260—343.2
10 Claims

ABSTRACT OF THE DISCLOSURE

The optically active naturally occurring anabolic agent (—)-zearalenone, heretofore available only through fermentation techniques, is prepared by chemical resolution from synthetically available racemic (±)-zearalenone 2,4-diloweralkyl ethers. The technique involves converting the racemic (±)-zearalenone 2,4-diloweralkyl ether into the corresponding racemic 4-monoloweralkyl ether; treating said 4-monoloweralkyl ether with optically active (—)-menthoxyacetyl chloride; crystallizing optically active (—) - zearalenone 4-monoloweralkyl ether-2-(—)-menthoxyacetate from methanolether; saponifying said menthoxyacetate to obtain optically active (—)-zearalenone 4-monoloweralkyl ether; and cleaving the ether grouping to obtain optically active (—)-zearalenone identical to the naturally occurring compound.

---

This invention relates to a new process for preparing the naturally occurring physiologically active compound, (—)-zearalenone. More particularly, this invention relates to a process for preparing (—)-zearalenone from racemic (±)-zearalenone diloweralkyl ether by chemical resolution.

Optically active (—)-zearalenone, 6-(10-hydroxy-6-oxo - trans - 1 - undecenyl)-β-resorcylic acid-μ-lactone, a potent anabolic agent useful in the raising of meat producing animals, originally was prepared by fermenting the microorganism, Gibberella zeae (Gordon), on a suitable nutrient medium according to the techniques described in U.S. Pat. No. 3,169,019. More recently, there has been described the total chemical synthesis of racemic (±)-zearalenone and the 2,4-dimethyl ether derivative thereof (Taub et al., Chemical Communications, 1967, page 225). To date, however, no means has been described for the synthetic preparation of the naturally occurring isomer.

The instant invention is based upon applicants' discovery that (—)-zearalenone can be obtained readily from racemic (±)-zearalenone 2,4-diloweralkyl ether by chemical resolution of the racemic mixture. The (—)-zearalenone so produced is in all respects identical to the naturally occurring compound. Thus, applicants, for the first time, have made available a synthetic route to (—)-zearalenone. The process of the instant invention, therefore, constitutes a significant advance in the chemical arts.

As the first step in the resolution according to the process of the instant invention, racemic (±)-zearalenone 2,4-diloweralkyl ether is converted into the corresponding 4-monomethyl ether by hydrolysis with a Lewis acid such as boron trichloride, boron trifluoride, boron tribromide, magnesium bromide and aluminum chloride in an inert organic solvent, such as methylene chloride, chloroform, hexane, benzene and the like, the preferred reagent being boron trichloride in methylene chloride. The reagents are combined at a reduced temperature, between about —15° to about —35° C. and the reaction mixture is poured over crushed ice and extracted with additional solvent. The organic phase is washed with water and with saturated aqueous salt solution and is then dried and concentrated to dryness to yield the crude product. Purification is achieved by conventional recrystallization from solvents, such as methanol, ethanol, acetone, hexane and the like, or from mixtures of such solvents.

The racemic (±)-zearalenone 4-monoloweralkyl ether produced above is next converted into optically active (—) - zearalenone 4 - monoloweralkyl ether - 2 - (—)-menthoxyacetate by treating the racemic zearalenone 4-monoloweralkyl ether with (—)-menthoxyacetyl chloride in the presence of an organic nitrogen base, such as pyridine, alkyl, pyridines, such as collidine and picoline, and alkyl amines, such as triethylamine. The reaction may be carried out in an excess of the nitrogen base or in a suitable organic solvent such as dioxane, benzene, hexane, chloroform and the like under nitrogen atmosphere. The reaction mixture is stirred at about 25° C. for 3 to 5 hours, diluted with water and extracted with a water immiscible solvent. The organic phase is washed with 1 N mineral acid, water, about 5 percent aqueous sodium bicarbonate and saturated aqueous salt solution and is dried. The washed extract is concentrated in vacuo and the residue taken up, in about 40 to about 60 percent methanol in ether. The crystalline product which separates on standing is recovered by filtration.

The (—)-zearalenone 4-monoloweralkyl ether 2-(—)-menthoxyacetate next is converted to the optically active (—)-zearalenone 4-monoloweralkyl ether by saponification with an aqueous inorganic base, such as aqueous sodium or potassium hydroxide. The menthoxyacetate, dissolved in a suitable solvent, such as methanol, ethanol, tetrahydrofuran, dioxane, acetone, and the like, is treated with the base (1 to 3 N) at about 25° C. for 1 to 3 hours. The reaction mixture is acidified and extracted with additional solvent. The extract is washed with aqueous sodium bicarbonate (about 5 percent), water and saturated aqueous salt solution and is dried. The washed extract is concentrated to dryness in vacuo to yield the desired (—)-zearalenone 4-monoloweralkyl ether.

Finally, the (—)-zearalenone 4-monoloweralkyl ether is subjected to ether cleavage to yield (—)-zearalenone identical to the naturally occurring product. This reaction is carried out by treating the 4-monoloweralkyl ether in a suitable solvent such as, methylene chloride, benzene, hexane, chloroform and the like with a Lewis acid such as described above at about 0° C.; the preferred reagent being boron tribromide in methylene chloride. The reaction is concentrated to dryness and the residue triturated with water. The precipitated crude product is recovered by filtration, washed with water and dried. Purification is achieved by preparative thin layer chromatography on silica gel coated plates using chloroform 10 percent acetonitrile as the developing solvent. The product is removed from the plates, dissolved in a minimum volume of nitromethane and hexane is added until precipitation begins. The purified product is separated by filtration and dried.

The best mode contemplated by applicants for carrying out their invention is more fully illustrated in the following examples. It is to be understood that no limitation is implied or intended except as set forth in the appended claims.

EXAMPLE 1

(±)-Zearalenone 4-monomethyl ether

Dissolve 496 mg. of (±)-zearalenone 2,4-dimethyl ether in 4 ml. of methylene chloride at —20° C. and add rapidly to 1.7 ml. of boron trichloride in 4 ml. of methylene chloride cooled to —20° C. Pour the reaction mixture immediately onto 50 gm. of crushed ice and extract with methylene chloride. Wash the extract with water and saturated aqueous salt solution. Dry the washed extract over magnesium sulfate and concentrate to dryness. Purify by recrystallization from methanol.

EXAMPLE 2

(—)-Zearalenone 4-monomethyl ether-2-(—)-menthoxyacetate

Add 0.67 ml. of (—)-menthoxyacetyl chloride dropwise to a stirred solution of (±)-zearalenone 4-monomethyl ether in 1.9 ml. of dioxane and 1.2 ml. of pyridine under nitrogen atmosphere. Stir the mixture at 25° C. for about 4 hours. Dilute the reaction mixture with water and extract with benzene. Wash the benzene extract with 1 N hydrochloric acid, water, 5 percent aqueous sodium bicarbonate and saturated aqueous salt solution. Dry the washed extract over magnesium sulfate and concentrate to dryness in vacuo. Take up the residue and methanol-ether (1:1) and allow to stand for about 20 hours. Separate the crystalline solid by filtration.

EXAMPLE 3

(—)-Zearalenone 4-monomethyl ether

Dissolve 600 mg. of (—)-zearalenone 4-monomethyl ether-2-(—)-menthoxyacetate prepared according to Example 2 and 12 ml. of methanol and saponify with 3 ml. of 2.5 N sodium hydroxide at 25° C. for 2 hours. Acidify the reaction mixture with cold 2.5 N hydrochloric acid and extract with chloroform. Wash the chloroform extract with 5 percent aqueous sodium bicarbonate, water and saturated aqueous salt solution. Dry the washed extract over magnesium sulfate and concentrate to dryness in vacuo.

EXAMPLE 4

(—)-Zearalenone

Dissolve 100 mg. of (—)-zearalenone 4-monomethyl ether with stirring in 1 ml. of methylene chloride at 0° C. and add 0.4 ml. of boron tribromide in 1 ml. of methylene chloride at 0° C. Concentrate the reaction mixture immediately to dryness under water pump vacuum (bath temperature about 30° C.). Triturate the solid residue with 5 ml. of water. Separate the precipitate by filtration, wash with water and dry in vacuo. Purify the crude product by preparative thin layer chromatography on silica gel coated glass plates using chloroform 10 percent acetonitrile as the developing solvent. Remove the product from the plates, dissolve in a minimum volume of nitromethane and add hexane until crystallization begins. Separate the purified product by filtration and dry.

Although the process of the instant invention has been illustrated above specifically with regard to the preparation of (—)-zearalenone by the chemical resolution of racemic (±)-zearalenone 2,4-dimethyl ether (and more particularly, by the chemical resolution of racemic (±)-zearalenone 4-monomethyl ether), it will be obvious, of course, to anyone skilled in the art that (—)-zearalenone may be obtained according to the process of this invention by employing racemic (±)-zearalenone 2,4-diloweralkyl ethers other than the 2,4-dimethyl ether as the starting material. Selection of the racemic (±)-zearalenone 2,4-diloweralkyl ether as starting material is a matter of choice merely dictated by the nature of the racemic material on hand. The term, loweralkyl, as used herein is intended to include straight and branched chain aliphatic hydrocarbon radicals having from 1 to 6 carbon atoms. Typical of such loweralkyl groupings are, for example, methyl, ethyl, propyl, isopropyl, n-butyl-tert-butyl and the like. Such racemic (±)-zearalenone 2,4-diloweralkyl ethers are either well known compounds per se or are readily prepared by methods conventional in the art.

Further, from a study of the foregoing description, many modifications in the process of the instant invention will suggest themselves to one skilled in the art. It will be obvious, for example, that racemic (±)-zearalenone 2,4-diethers other than 2,4-diloweralkyl ethers may be employed as starting materials. Typical of such diethers are, for example, aryl diethers, such as (±)-zearalenone 2,4-diphenyl ether, and aralkyl diethers, such as (±)-zearalenone 2,4-dibenzyl ether. Applicants consider all such modifications to be the full equivalent of the process described herein and to fall within the scope of the instant invention.

The subject matter which applicants regard as their invention is particularly pointed out and distinctly claimed as follows:

1. The process for preparing optically active (—)-zearalenone which comprises:
   (a) treating racemic (±)-zearalenone 2,4-diloweralkyl ether in an inert organic solvent with a Lewis acid at a temperature of from —15 to —30° C. to produce the corresponding racemic (±)-zearalenone 4-monoloweralkyl ether; and
   (b) treating said racemic 4-monoloweralkyl ether with (—)-menthoxyacetyl chloride in the presence of an organic nitrogen base and separating optically active (—)-zearalenone 4-monoloweralkyl ether-2-(—)-menthoxy acetate from the reaction mixture by crystallization from about 40 to about 60 percent methanol in ether; and
   (c) saponifying said (—)-zearalenone 4-monoloweralkyl ether-2-(—)-menthoxyacetate in aqueous inorganic base to produce optically active (—)-zearalenone 4-monoloweralkyl ether; and
   (d) treating said (—)-zearalenone 4-monoloweralkyl ether in an inert organic solvent with a Lewis acid at a temperature about 0° C. to produce (—)-zearalenone.

2. The process of claim 1 wherein the loweralkyl group is methyl.

3. The process of claim 2 wherein the racemic (±)-zearalenone 2,4-dimethyl ether is treated with boron trichloride in methylene chloride.

4. The process of claim 2 wherein the organic nitrogen base is pyridine.

5. The process of claim 2 wherein the (—)-zearalenone 4-monomethyl ether is treated with boron tribromide in methylene chloride.

6. The process for preparing (—)-zearalenone 4-monoloweralkyl ether-2-(—)-menthoxyacetate which comprises treating racemic (±)-zearalenone 4-monoloweralkyl ether with (—)-menthoxyacetyl chloride in the presence of an organic nitrogen base and separating said (—)-zearalenone 4-monoloweralkyl ether-2-(—)-menthoxyacetate from the reaction mixture by crystallization from about 40 to about 60 percent methanol in ether.

7. The process of claim 6 wherein the loweralkyl group is methyl.

8. The process of claim 7 wherein the organic nitrogen base is pyridine.

9. (—)-Zearalenone 4-monolower-alkyl ether-2-menthoxyacetate.

10. The compound of claim 9 wherein the loweralkyl group is methyl.

References Cited

UNITED STATES PATENTS 3,373,036  3/1968  Hodge et al. _____ 260—343.2

JAMES A. PATTEN, Primary Examiner